US009813765B2

United States Patent
Park

(10) Patent No.: US 9,813,765 B2
(45) Date of Patent: *Nov. 7, 2017

(54) BROADCAST SIGNAL RECEIVER, METHOD FOR PROVIDING BROADCAST SIGNAL RELATION INFORMATION, AND SERVER

(71) Applicant: SAMSUNG ELECTRONICS CO., LTD., Suwon-si (KR)

(72) Inventor: Tae-suh Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/991,051

(22) Filed: Jan. 8, 2016

(65) Prior Publication Data

US 2016/0127781 A1    May 5, 2016

Related U.S. Application Data

(63) Continuation of application No. 13/533,597, filed on Jun. 26, 2012, now Pat. No. 9,240,851.

(30) Foreign Application Priority Data

Aug. 10, 2011  (KR) .................. 10-2011-0079555

(51) Int. Cl.
| | |
|---|---|
| *H04N 21/44* | (2011.01) |
| *H04N 21/462* | (2011.01) |
| *H04H 20/93* | (2008.01) |
| *H04N 21/81* | (2011.01) |

(52) U.S. Cl.
CPC ........ *H04N 21/4622* (2013.01); *H04H 20/93* (2013.01); *H04N 21/44008* (2013.01); *H04N 21/8133* (2013.01)

(58) Field of Classification Search
None
See application file for complete search history.

(56) References Cited

U.S. PATENT DOCUMENTS

| | | | |
|---|---|---|---|
| 6,088,455 | A | 7/2000 | Logan et al. |
| 7,975,062 | B2 | 7/2011 | Krikorian et al. |
| 8,756,623 | B2 | 6/2014 | Park et al. |
| 2001/0001160 | A1* | 5/2001 | Shoff ................. H04N 5/44543 725/51 |
| 2001/0001166 | A1 | 5/2001 | Ladouceur et al. |
| 2004/0199387 | A1 | 10/2004 | Wang et al. |
| 2007/0006260 | A1 | 1/2007 | Yoon et al. |
| 2007/0061858 | A1 | 3/2007 | Ura |

(Continued)

FOREIGN PATENT DOCUMENTS

| | | |
|---|---|---|
| EP | 1 653 381 A2 | 5/2006 |
| GB | 2472531 A | 2/2011 |

(Continued)

OTHER PUBLICATIONS

Communication from United States Patent and Trademark Office dated Aug. 7, 2015, in U.S. Appl. No. 14/724,830.

(Continued)

*Primary Examiner* — Cai Chen
(74) *Attorney, Agent, or Firm* — Sughrue Mion, PLLC

(57) ABSTRACT

A broadcast signal receiver capable of displaying relation information corresponding to a broadcast signal in real time.

19 Claims, 11 Drawing Sheets

(56) References Cited

U.S. PATENT DOCUMENTS

| | | |
|---|---|---|
| 2008/0059999 A1 | 3/2008 | Winans et al. |
| 2008/0221942 A1 | 9/2008 | Agnihotri et al. |
| 2008/0285890 A1 | 11/2008 | Han et al. |
| 2009/0070540 A1 | 3/2009 | Dewa |
| 2009/0247135 A1 | 10/2009 | Yuki |
| 2010/0036812 A1 | 2/2010 | Choi et al. |
| 2011/0007212 A1 | 1/2011 | Lee et al. |
| 2011/0016415 A1 | 1/2011 | Nam et al. |

FOREIGN PATENT DOCUMENTS

| | | |
|---|---|---|
| JP | 2007-110671 A | 4/2007 |
| JP | 2008-5252 A | 1/2008 |
| JP | 2009-65422 A | 3/2009 |
| JP | 2009-80606 A | 4/2009 |
| JP | 2011-41053 A | 2/2011 |
| KR | 1020090043526 A | 5/2009 |
| KR | 10-2010-0054297 A | 5/2010 |
| KR | 10-2011-0005456 A | 1/2011 |
| KR | 10-2011-0006305 A | 1/2011 |
| WO | 2010/082148 A1 | 7/2010 |

OTHER PUBLICATIONS

Office Action (Patent Examination Report) dated May 11, 2016, issued by the Australian Patent Office in counterpart Australian Application No. 2012293084.

Communication dated Jul. 26, 2016, from the Japanese Patent Office in counterpart application No. 2012-147227.

Communication dated Nov. 12, 2012 issued by the International Searching Authority in counterpart International Application No. PCT/KR2012/003441.

Communication, dated Aug. 22, 2013, issued by the European Patent Office in counterpart European Patent Application No. 12165115.2.

Non-Final U.S. Office Action, dated Jul. 19, 2013, issued by the USPTO in related U.S. Appl. No. 13/617,373.

Communication dated Sep. 10, 2014 issued by the U.S. Patent and Trademark Office in counterpart U.S. Appl. No. 14/294,135.

Non-Final U.S. Office Action, dated Sep. 10, 2013, issued by the USPTO in related U.S. Appl. No. 13/533,597.

Final U.S. Office Action, dated Apr. 4, 2014, issued by the USPTO in related U.S. Appl. No. 13/533,597.

U.S. Advisory Action, dated Jun. 30, 2014, issued by the USPTO in related U.S. Appl. No. 13/533,597.

Non-Final U.S. Office Action, dated Oct. 23, 2014, issued by the USPTO in related U.S. Appl. No. 13/533,597.

Final U.S. Office Action, dated Mar. 23, 2015, issued by the USPTO in related U.S. Appl. No. 13/533,597.

U.S. Notice of Allowance, dated Sep. 9, 2015, issued by the USPTO in related U.S. Appl. No. 13/533,597.

Communication dated May 10, 2017 by the Korean Intellectual Property Office in counterpart Korean Patent Application No. 10-2011-0079555.

\* cited by examiner

FIG. 2

| BROADCASTING STATION ID | EXECUTION CONDITION | APPLICATION ID | SOURCE INFORMATION OF RELATION INFORMATION |
|---|---|---|---|

* PROGRAM ID
* PROGRAM BROADCASTING TIME
* BROADCAST SIGNAL CHARACTERISTIC INFORMATION

BROADCAST SIGNAL RECEIVER, METHOD FOR PROVIDING BROADCAST SIGNAL RELATION INFORMATION, AND SERVER

CROSS-REFERENCE TO RELATED APPLICATION

This application is a Continuation of U.S. application Ser. No. 13/533,597 filed on Jun. 26, 2012, which claims priority from Korean Patent Application No. 10-2011-0079555, filed on Aug. 10, 2011 in the Korean Intellectual Property Office, the disclosures of which are incorporated herein by reference in their entireties.

BACKGROUND

Field

Apparatuses and methods consistent with the exemplary embodiments relate to a broadcast signal receiver, a method for providing broadcast signal relation information, and a server.

Description of the Related Art

Media contents are information that can be provided based on a media such as terrestrial broadcasting, satellite broadcasting, cable broadcasting, Internet broadcasting, digital multimedia broadcasting, a Blu-ray disc (BD), a digital versatile disc (DVD), or a like storage medium. The media contents may be represented in the format of audio and/or video (or image) and/or a text, and given as broadcast contents or multimedia contents.

Because the broadcast contents have been the most widely spread media contents, it is important to provide a user with relation information corresponding to the broadcast contents, such as contents guide information, location information, goods information, actor/actress information, artist information, banner advertisement information, advertiser information, media contents purchase information, event information, etc., in real time.

However, devices capable of reproducing broadcast contents may not have a function of providing the relation information. In this case, a user may use a device capable of accessing the Internet to obtain the relation information through Internet searching based on information about the broadcast contents known to a user.

It is difficult for a user to obtain the relation information, synchronized with the broadcast contents being currently reproduced, in real time. Further, information related to the media contents is limited since the Internet searching is based on the information known to the user.

SUMMARY

One or more exemplary embodiments provide a broadcast signal receiver, and a method for providing broadcast signal relation information, in which relation information corresponding to a broadcast signal can be displayed in real time.

According to an aspect of an exemplary embodiment, there is provided a broadcast signal receiver and a method for providing broadcast signal relation information, in which an application program for providing the broadcast signal relation information is simplified.

According to aspect of an exemplary embodiment, there is provided a broadcast signal receiver and a method for providing broadcast signal relation information, in which the broadcast signal relation information can be provided even though a broadcasting program is not identifiable from a broadcast signal.

According to an aspect of an exemplary embodiment, there is provided a condition information providing server that provides condition information for providing relation information.

According to an aspect of an exemplary embodiment, there is provided a server that provides identification information so that a broadcasting program can be identified using a fingerprint.

The foregoing and/or other aspects may be achieved by providing a broadcast signal receiver capable of accessing a predetermined server through a network, the broadcast signal receiver including: a first receiver which receives a broadcast signal containing a broadcasting program; a second receiver which receives condition information that comprises source information of relation information, the source information of relation information identifying a source of the relation information, and an execution condition for providing the relation information corresponding to the broadcasting program; and a relation information provider which detects an occurrence of the execution condition, requests the relation information from the source of the relation information by using the source information of the relation information in response to detecting the occurrence of the condition, receives the relation information from the source of the relation information, and displays the received relation information.

The source of the relation information may be one among a plurality of relation information providing servers by using the source information of the relation information.

The source information of relation information may include a server address of the source of the relation information, and the relation information provider may receive the relation information from the source of the relation information corresponding to the server address through the second receiver.

The second receiver may receive the execution condition from a condition information providing server, and the execution condition may be provided from the relation information providing server to the condition information providing server.

The condition information may further include broadcasting program identification information that identifies the broadcasting program, and the broadcast signal receiver may further include a controller that extracts the execution condition corresponding to the broadcasting program using the broadcasting program identification information.

The controller may extract program identification (ID) or channel ID from the received broadcast signal, and compare the extracted program ID or channel ID with the broadcasting program identification information to extract the source information of the relation information corresponding to the broadcasting program.

The broadcast signal receiver may further include a controller that generates a fingerprint of a broadcasting program being currently displayed, transmits the generated fingerprint to a server that previously receives a broadcast signal containing the broadcasting program and stores a fingerprint corresponding to the broadcast signal, and receives program ID or channel ID corresponding to the fingerprint transmitted from the server.

The condition information may further include broadcasting program identification information, and the controller may compare the received program ID or channel ID with the broadcasting program identification information, and extract the source information of the relation information corresponding to the broadcasting program based on a result of the comparing.

The relation information provider may include at least two application programs, the condition information may include application ID for selecting one of the at least two application programs, and the relation information may be provided by the application program selected based on the application ID.

The relation information provider may stop providing the relation information if a channel of a broadcast signal being currently received is changed.

Another aspect may be achieved by providing a method of providing relation information related to a broadcast signal, the method including: receiving a broadcast signal containing a broadcasting program; receiving condition information that comprises source information of relation information, the source information of relation information identifying a source of the relation information, and an execution condition for providing the relation information corresponding to the broadcasting program; detecting an occurrence of the execution condition, requesting the relation information from the source of the relation information by using the source information of the relation information, and receiving the relation information from the source of the relation information; and displaying the received relation information.

The condition information may further include broadcasting program identification information that identifies the broadcasting program, and the method may further include extracting the execution condition corresponding to the broadcasting program using the broadcasting program identification information.

The method may further include extracting program identification (ID) or channel ID from the received broadcast signal; and comparing the extracted program ID or channel ID with the broadcasting program identification information to extract the source information of the relation information corresponding to the broadcasting program.

The method may further include generating a fingerprint of a broadcasting program being currently displayed; transmitting the generated fingerprint to a server that previously receives a broadcast signal containing the broadcasting program and stores a fingerprint corresponding to the broadcast signal; and receiving program ID or channel ID corresponding to the fingerprint transmitted from the server.

The condition information may further include broadcasting program identification information, and the method may further include comparing the received program ID or channel ID with the broadcasting program identification information, and extracting the source information of the relation information corresponding to the broadcasting program based on a result of the comparing.

Still another aspect may be achieved by providing a broadcast signal receiver capable of accessing a predetermined server through a network, the broadcast signal receiver including: a first receiver which receives a broadcast signal containing a broadcasting program; a second receiver which receives condition information that comprises source information of relation information, the source information of relation information identifying a source of the relation information, and an execution condition for providing the relation information corresponding to the broadcasting program; a relation information provider which receives the relation information by using the source information of the relation information; and a controller which transmits broadcasting program identification information corresponding to the broadcasting program to an external condition information providing server, receives the condition information from the condition information providing server, and provides the condition information to the relation information provider.

Still another aspect may be achieved by providing a method of providing relation information related to a broadcast signal, the method including: receiving a broadcast signal containing a broadcasting program; transmitting broadcasting program identification information corresponding to the broadcasting program to an external condition information providing server; receiving condition information that comprises source information of relation information, the source information of relation information identifying a source of the relation information, and an execution condition for providing the relation information corresponding to the broadcasting program from the condition information providing server; receiving the relation information by using the source information of the relation information; and displaying the received relation information.

Still another aspect may be achieved by providing a condition information providing server including: a storage unit which stores condition information corresponding to a broadcasting program registered by a content provider; and a controller which provides the condition information to a broadcast signal receiver in response to receiving a request for the condition information from the broadcast signal receiver.

The controller may receive a broadcast signal containing the broadcasting program, generate a fingerprint corresponding to the broadcast signal, and send the broadcast signal receiver identification information about a broadcasting program corresponding to a fingerprint matching with the fingerprint transmitted from the broadcast signal receiver.

Still another aspect may be achieved by providing a server including: a fingerprint generator which receives a broadcast signal containing a broadcasting program and generates a fingerprint corresponding to the broadcast signal; and a controller which sends the broadcast signal receiver identification information about a broadcasting program corresponding to a fingerprint matching with the fingerprint transmitted from the broadcast signal receiver.

BRIEF DESCRIPTION OF THE DRAWINGS

The above and/or other aspects will become apparent from the following description of the exemplary embodiments, taken in conjunction with the accompanying drawings, in which:

FIG. 2 is a view showing condition information received in the broadcast signal receiver of FIG. 1;

DETAILED DESCRIPTION OF EXEMPLARY EMBODIMENTS

Figure 1:
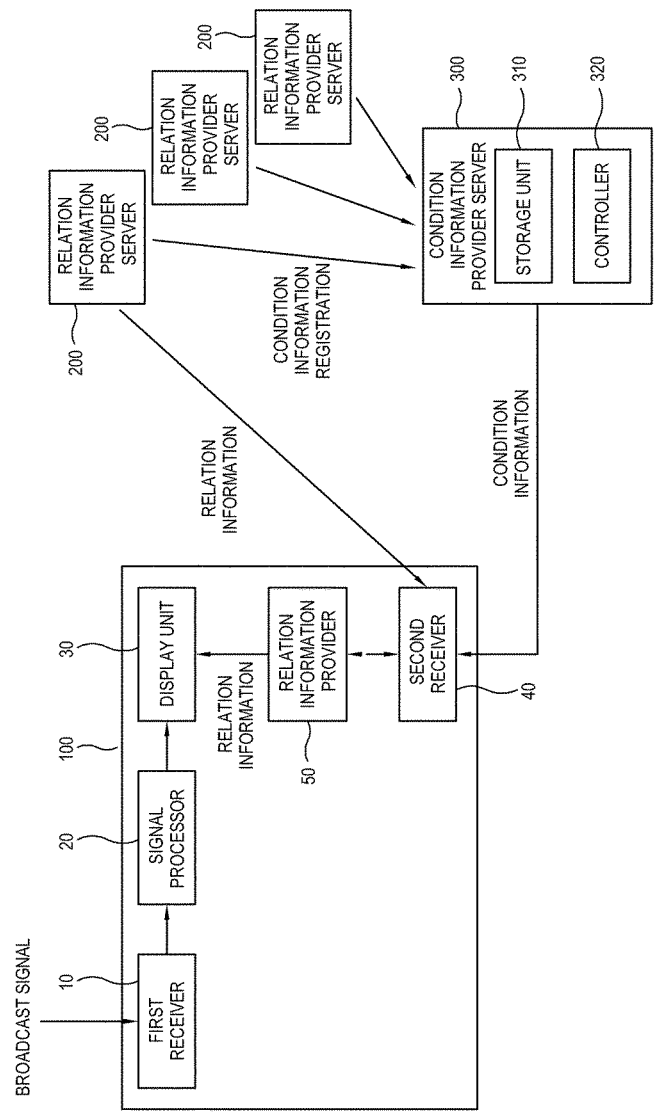
FIG. 1 is a control block diagram showing a system including a broadcast signal receiver according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a control block diagram showing a system including a broadcast signal receiver according to an exemplary embodiment.

As shown in FIG. 1, the broadcast signal receiver 100 communicates with a plurality of relation information providing servers 200 and a condition information providing server 300. The broadcast signal receiver 100 includes a first receiver 10 and a second receiver 40. The relation information providing server 200 and the condition information providing server 300 provide relation information and condition information to the broadcast signal receiver 100 while communicating with the second receiver 40. The relation information providing server 200 provides the relation information corresponding to a broadcasting program contained in a broadcast signal, and the condition information providing server 300 provides the condition information about a condition for providing the relation information to the broadcast signal receiver 100.

The relation information may include an advertisement related to a broadcasting program, a user interface (UI) for questions related to the broadcasting program, broadcasting program guide information, performance information, various regional information such as amenities information, traffic information, famous restaurant information, etc., if a broadcasting program corresponds to certain regional broadcast, information about a synopsis or actor/actress if a movie is broadcasted, and information about how to use a certain product, etc. Thus, the relation information providing server 200 may include a server such as a broadcasting station, an advertiser, a local government, a manufacturer, a film company, etc. The relation information providing server 200 may further include an independent server of a company providing the relation information, and may be an intermediate server that receives the relation information from the companies and provides the relation information to the broadcast signal receiver 100. In this exemplary embodiment, the plurality of relation information providing servers 200 are provided, but not limited thereto. Alternatively, there may be provided a single relation information providing server.

The condition information providing server 300 receives condition information from the relation information providing server 200 and supplies the condition information to the broadcast signal receiver 100. The condition information providing server 300 includes a storage unit 310 that stores condition information corresponding to a broadcasting program registered by a content provider, such as the relation information providing server 200, and a controller 320 that provides the condition information registered as requested by the broadcast signal receiver 100 to the broadcast signal receiver 100. The condition information may be periodically supplied to the broadcast signal receiver 100, and may be supplied in response to a certain event. For example, the broadcast signal receiver 100 may access the condition information providing server 300 at intervals corresponding to an update cycle, or may access the condition information providing server 300 whenever a channel of a broadcast signal is changed, thereby receiving the condition information. The condition information may be downloaded in the broadcast signal receiver 100 by the broadcast signal receiver 100, and may be distributed to the broadcast signal receiver 100 by the condition information providing server 300.

The broadcast signal receiver 100 includes the first receiver 10, a signal processor 20, a display unit 30, the second receiver 40, and a relation information provider 50. The broadcast signal receiver 100 may include a computer, a mobile device, and a device such as a television (TV) connectable to a wired/wireless network, which can receive and reproduce a broadcast signal. The mobile device may include a portable device such as a cellular phone, a smart phone, a personal digital assistant (PDA), a portable multimedia player (PMP), and a navigation device. The TV may be involved in the mobile device, and may be a device such as an Internet protocol (IP) TV or a digital multimedia broadcasting terminal. The broadcast signal receiver 100 may be mentioned as a user device. The broadcast signal receiver 100 may further include a storage unit, a button, an input pad or a user input unit, such as a remote controller, even though they are not shown herein.

The first receiver 10 receives a broadcast signal through a broadcasting service such as terrestrial broadcasting, satellite broadcasting, cable broadcasting, Internet broadcasting, and digital multimedia broadcasting. The broadcast signal may contain contents, such as an audio signal and a video signal, various data for explaining the contents, and a supplementary signal. Such contents may contain various broadcasting programs, various advertisements, etc., provided by the broadcasting station or the content provider. The first receiver 10 may include at least one of a tuner having a channel tuning function, a network interface, a set-top box connector, a cable connector, etc., to receive the broadcast signal as above.

The signal processor 20 processes a received broadcast signal to be displayed on the display unit 30. The signal processor 20 may include a video processor (not shown) and an audio processor (not shown), and perform demultiplexing, decoding, scaling, image quality adjustment, image quality enhancement, etc.

The display unit 30 displays the broadcast signal processed by the signal processor 20 and the relation information provided by the relation information provider 50 to be described later. The display unit 30 may include a liquid crystal display (LCD) panel having liquid crystal, an organic light emitting diode (OLED) panel having an organic light emitting diode, or a plasma display panel (PDP), a flexible display, a three-dimensional (3D) display, etc., and include a panel driver for driving the above panel.

The second receiver 40 may be an interface for receiving various information and contents through a web network such as Internet. In this exemplary embodiment, the second receiver 40 receives the relation information and the condition information. The second receiver 40 in this exemplary embodiment is illustrated as one block for explaining the function of the configuration for receiving signals except the broadcast signal received by the first receiver 10. Thus, there may be provided a plurality of second receivers 40 in accordance with the kinds of received information and the characteristics of the server.

The condition information may be information about a condition for providing the relation information corresponding to the broadcasting program. As illustrated in FIG. 2, the condition information includes broadcasting station identification (ID), execution condition, application ID, and source information of the relation information, which informs a source of supplying the relation information. The execution condition may include broadcasting program ID, broadcasting time of the broadcasting program, characteristic information about the broadcasting program, etc. The broadcasting station ID, the broadcasting program ID, the broadcasting time of the broadcasting program, or the characteristic information about the broadcasting program may be broadcasting program ID information for identifying the broadcasting program. The application ID may be information for specifying one application program if there is a plurality of application programs for providing the relation information. The source information of the relation information may include a server address of the relation information providing server 200, i.e., universal resource locator (URL) information.

The relation information provider 50 receives the condition information and the relation information through the second receiver 40, and processes the received relation information to be displayed on the display unit 30. As described above, the condition information indicates a condition for providing the relation information. The relation information provider 50 determines whether there is the condition information corresponding to the broadcasting program being currently broadcasted, accesses the corresponding relation information providing server 200 through the source information of the relation information, i.e., through the server address if there is the condition information, and downloads the relation information from the accessed relation information providing server 200 into the broadcast signal receiver 100.

Figure 3:
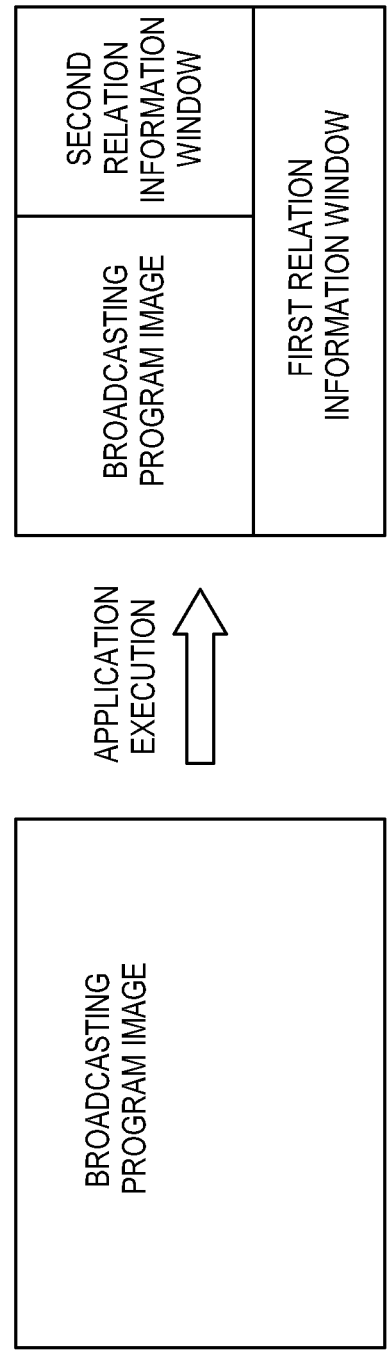
FIG. 3 is a view showing relation information displayed in the broadcast signal receiver of FIG. 1.

The relation information received into the broadcast signal receiver 100 is displayed on the display unit 30 as shown in FIG. 3. The relation information may be displayed at an edge portion of the display unit 30 in order not to interfere with an image of the broadcasting program. As shown in FIG. 3, two or more relation information corresponding to the broadcasting program may be displayed. Alternatively, one relation information may be displayed. The relation information may have transparency and be overlapped on the image of the broadcasting program. Also, the relation information may not be displayed on the display unit 30 in accordance with a user's selection. In this case, the relation information provider 50 may provide a user with a user interface (UI) for asking the user whether to display the relation information if the relation information is received. If a user instructs to display the relation information, the relation information may be displayed on a relation information window.

The relation information provider 50 may be achieved by an application program, such as a widget that accesses the relation information providing server 200 and downloads and displays the relation information. Also, the relation information provider 50 may include a graphic user interface (GUI) generator which receives data or the like and generates it as a GUI such as on screen display (OSD). There may be provided a plurality of widgets. The relation information provider 50 may be installed in the broadcast signal receiver 100 when the broadcast signal receiver 100 is manufactured, or may be downloaded from the relation information providing server 200 providing the relation information.

According to an exemplary embodiment, the broadcast signal receiver 100 receives the server address of the server providing the relation information as the condition information for receiving the relation information, and accesses the server address in real time and receives the relation information corresponding to the broadcasting program if the condition information corresponds to the broadcasting program being currently received. In this case, there is no need of an individual application program for providing the relation information corresponding to an individual broadcasting program, so that a storage space where data occupies can be reduced and the application program can be simply administrated.

In the above exemplary embodiment, the relation information may be received in real time from the exterior, but not limited thereto. Alternatively, the relation information may be internally stored in the broadcast signal receiver 100. If the relation information is stored, the broadcast signal receiver may receive and store the relation information on a certain cycle or in response to a special event.

Figure 4:
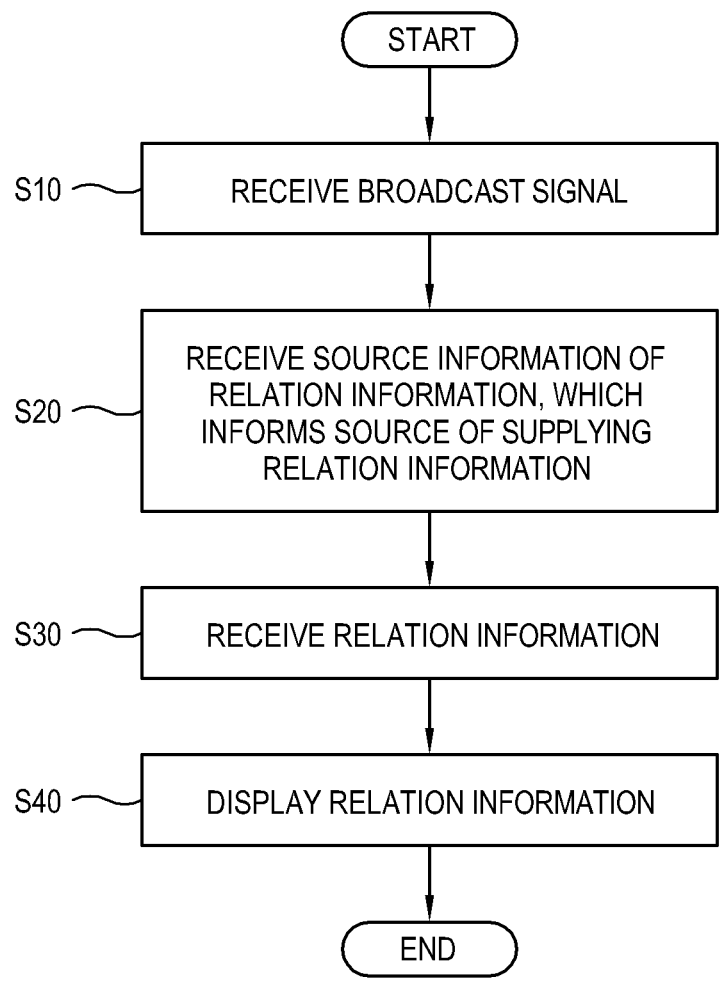
FIG. 4 is a control flowchart for explaining a method of providing relation information by the broadcast signal receiver of FIG. 1.

FIG. 4 is a control flowchart for explaining a method of providing relation information by the broadcast signal receiver of FIG. 1. Referring to FIG. 4, the method of providing the relation information according to an exemplary embodiment is as follows.

First, at operation S10, the broadcast signal receiver 100 receives a broadcast signal containing a broadcasting program.

At operation S20, the source information of the relation information, which informs a source of supplying the relation information, is received as a condition for providing the relation information corresponding to the broadcasting program.

The order of receiving the broadcast signal and the source information of the relation information may be reversed. Alternatively, the broadcast signal and the source information of the relation information may be received at the same time.

At operation S30, the relation information provider 50 receives the relation information from the relation information providing server 200 in accordance with the source information of the relation information if the currently displayed broadcasting program is matched with the condition information.

At operation S40, the relation information provider 50 processes the received relation information and displays the relation information based on the condition information.

If a channel of the broadcast signal being currently received is changed, the relation information provider 50 may stop providing the relation information being displayed.

Figure 5:
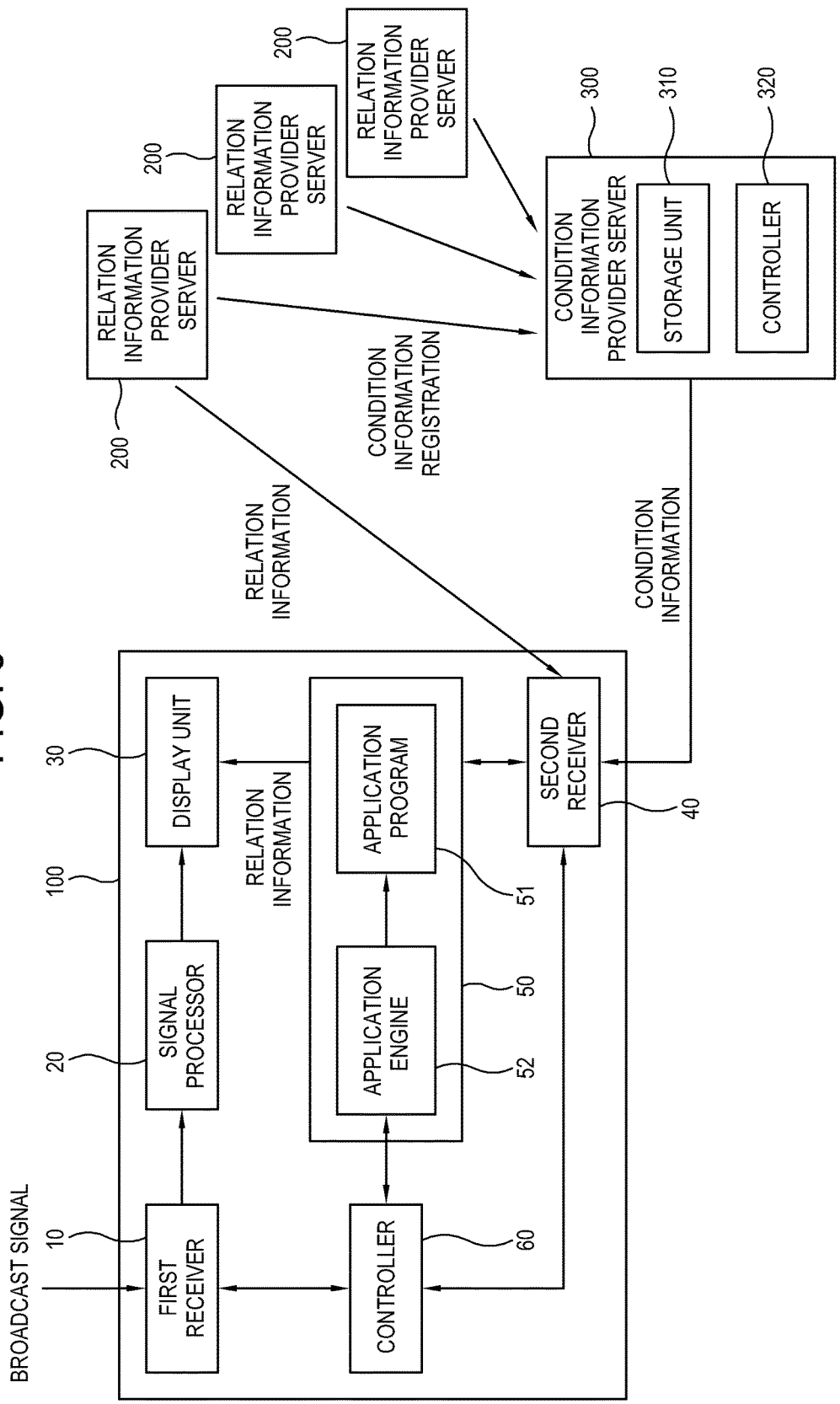
FIG. 5 is a control block diagram showing a system including a broadcast signal receiver according to an exemplary embodiment.

FIG. 5 is a control block diagram showing a system including a broadcast signal receiver according to an exemplary embodiment.

As shown in FIG. 5, the broadcast signal receiver 100 in this exemplary embodiment may further include a controller 60 for extracting a condition for displaying the relation information corresponding to the broadcasting program being currently displayed, on the basis of the broadcasting program identification information contained in the condition information. Also, the relation information provider 50 includes an application program 51 and an application engine 52 for driving the application program 51. The application program 51 is installed and executed in the broadcast signal receiver 100, and may be an application program installed for playing various contents. The application program 51 may be displayed as a GUI on the display unit 30 in the form of a thumbnail or an icon.

The controller 60 extracts a program ID or a channel ID from the received broadcast signal, and compares the extracted program ID or channel ID with the broadcasting program identification information contained in the condition information, thereby determining the source information of the relation information corresponding to the broadcasting program being currently displayed.

The controller 60 may extract the program ID or the channel ID corresponding to the broadcasting program being currently received, from meta information, supplementary information or electronic program guide (EPG) information. The condition information may include information about a plurality of broadcasting programs, and the controller 60 extracts the condition information corresponding to the broadcasting program being currently received, among a plurality of condition information and extracts the source information of the relation information corresponding to the extracted program ID or channel ID among the condition information.

The controller 60 provides the extracted source information of the relation information to the application engine 52 of the relation information provider 50. The application engine 52 drives the application program 51 to access the server address and receive the relation information.

Figure 6:
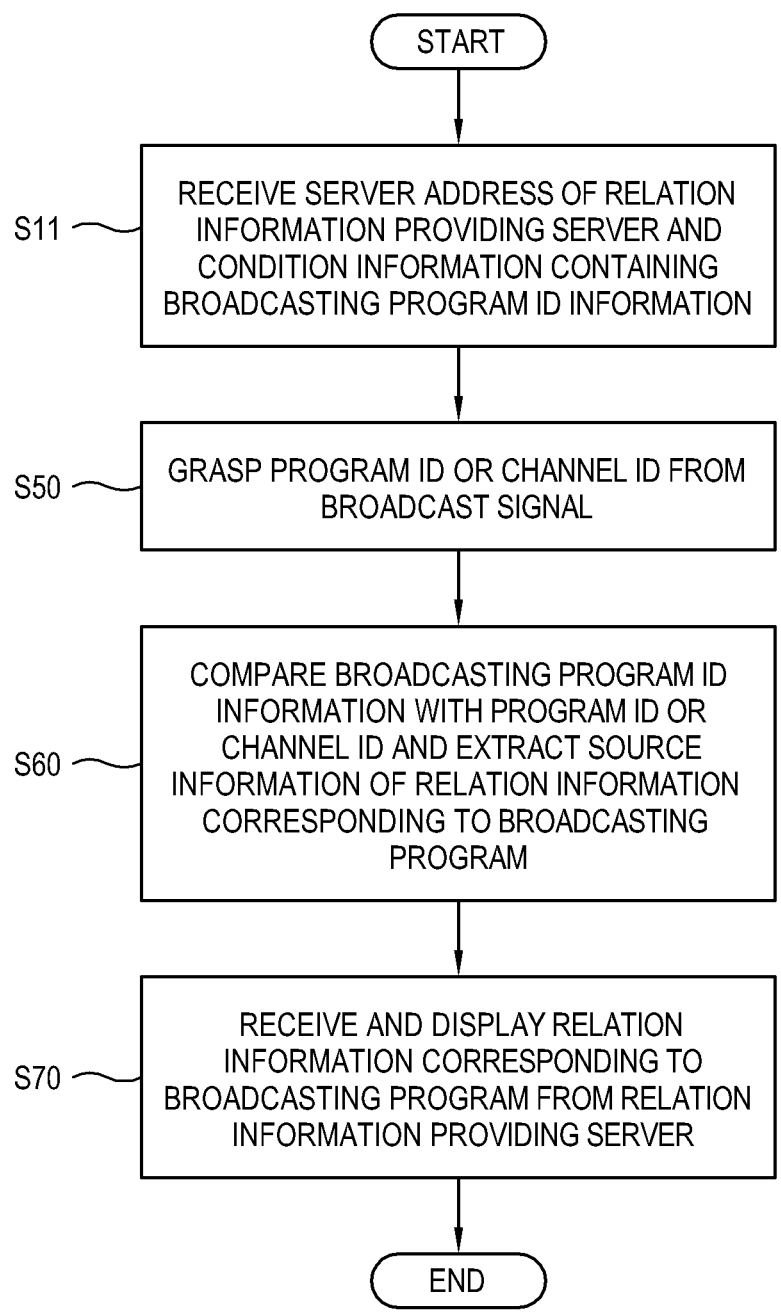
FIG. 6 is a control flowchart for explaining a method of providing relation information by the broadcast signal receiver of FIG. 5.

FIG. 6 is a control flowchart for explaining a method of providing relation information by the broadcast signal receiver of FIG. 5.

At operation S11, the controller 60 receives a broadcast signal through the first receiver 10, and receives the condition information containing the server address of the relation information providing server 200 and the broadcasting program identification information through the second receiver 40.

At operation S50, the controller 60 extracts the program ID or the channel ID from the broadcast signal.

At operation S60, the controller 60 extracting the program ID or the channel ID in real time compares the program ID or the channel ID with the broadcasting program identification information contained in the condition information, and extracts the source information of the relation information corresponding to the broadcasting program being currently received and displayed.

The controller 60 provides the extracted server information of the relation information providing server 200 to the relation information provider 50.

The application engine 52 drives the application program 51 to access the relation information providing server 200 and download the corresponding relation information. At operation S70, the relation information received in the broadcast signal receiver 100 is processed by the application program 51 and displayed on the display unit 30.

Figure 7:
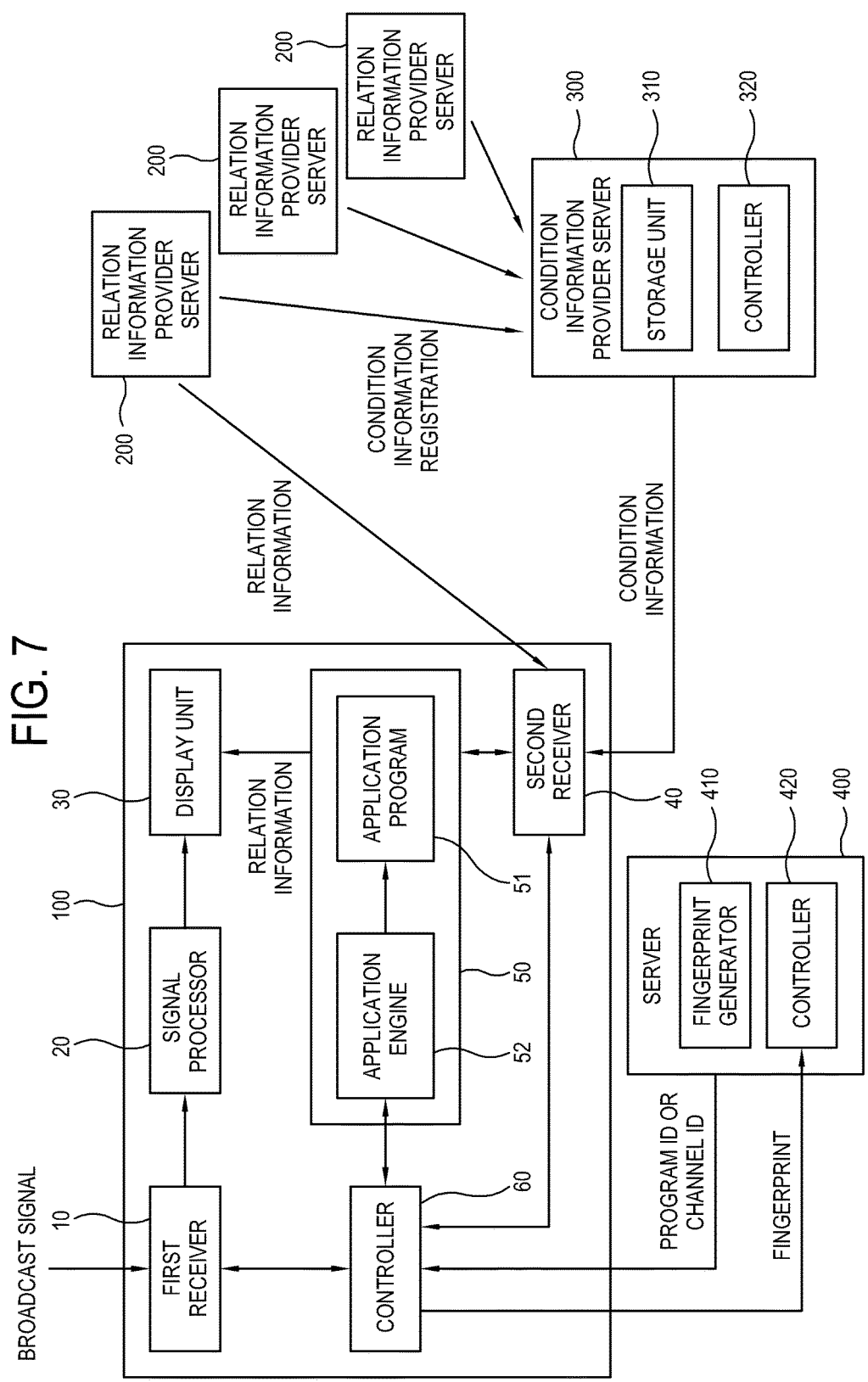
FIG. 7 is a control block diagram showing a system including a broadcast signal receiver according to an exemplary embodiment.

FIG. 7 is a control block diagram showing a system including a broadcast signal receiver according to an exemplary embodiment.

The controller 60 in this exemplary embodiment communicates with an external server 400, and acquires program ID or channel ID corresponding to a broadcast signal being currently received from the external server 400.

The server 400 includes a fingerprint generator 410 for receiving a broadcast signal containing a broadcasting program and generating a fingerprint corresponding to the broadcast signal, and a controller 420 sending the broadcast signal receiver 100 identification information about the broadcasting program corresponding to a fingerprint matching with the fingerprint received from the broadcast signal receiver 100. The server 400 receives a broadcast signal earlier by predetermined time than the broadcast signal received in the broadcast signal receiver 100, and generates the fingerprint of the broadcast signal. The fingerprint means data or operation values for identifying a video frame, which can be generated by well-known digital signal processing. For example, the fingerprint generator 410 may use a feature point extracting algorithm, such as scale invariant feature transform (SIFT), speed up robust feature (SURF), and maximum stale extremal regions (MSER), to generate a digital fingerprint of a video frame.

If the broadcast signal receiver 100 receives a broadcast signal through the set-top box, audio and video signals constituting the broadcast signal are input to the broadcast signal receiver 100 and reproduced, but other information, such as EPG information or broadcast meta information, may not be received in the broadcast signal receiver 100. If the standards of data transmission between the set-top box and the broadcast signal receiver 100 are not clearly set up and the reception of other information is not secured, a problem arises in that the broadcast signal receiver 100 may not use other information and cannot identify the broadcasting program being currently received.

In this case, the controller 60 may receive identification information about the broadcast signal being currently received through the server 400, i.e., may receive the program ID or the channel ID. The controller 60 generates a fingerprint of a broadcasting program being currently displayed, by the foregoing method, and transmits the generated fingerprint to the server 400 that previously receives the broadcast signal and stores the fingerprint corresponding to the broadcast signal. The server 400 provides the program ID or the channel ID corresponding to the received fingerprint to the controller 60.

The controller 60 compares the program ID or the channel ID provided from the server 400 with the broadcasting program identification information contained in the condition information, and extracts the source information of the relation information corresponding to the broadcasting program being currently displayed. Thus, even the broadcast signal receiver 100, which cannot extract the broadcasting program from the broadcast signal, can display the relation information matching with the broadcasting program in real time.

Figure 8:
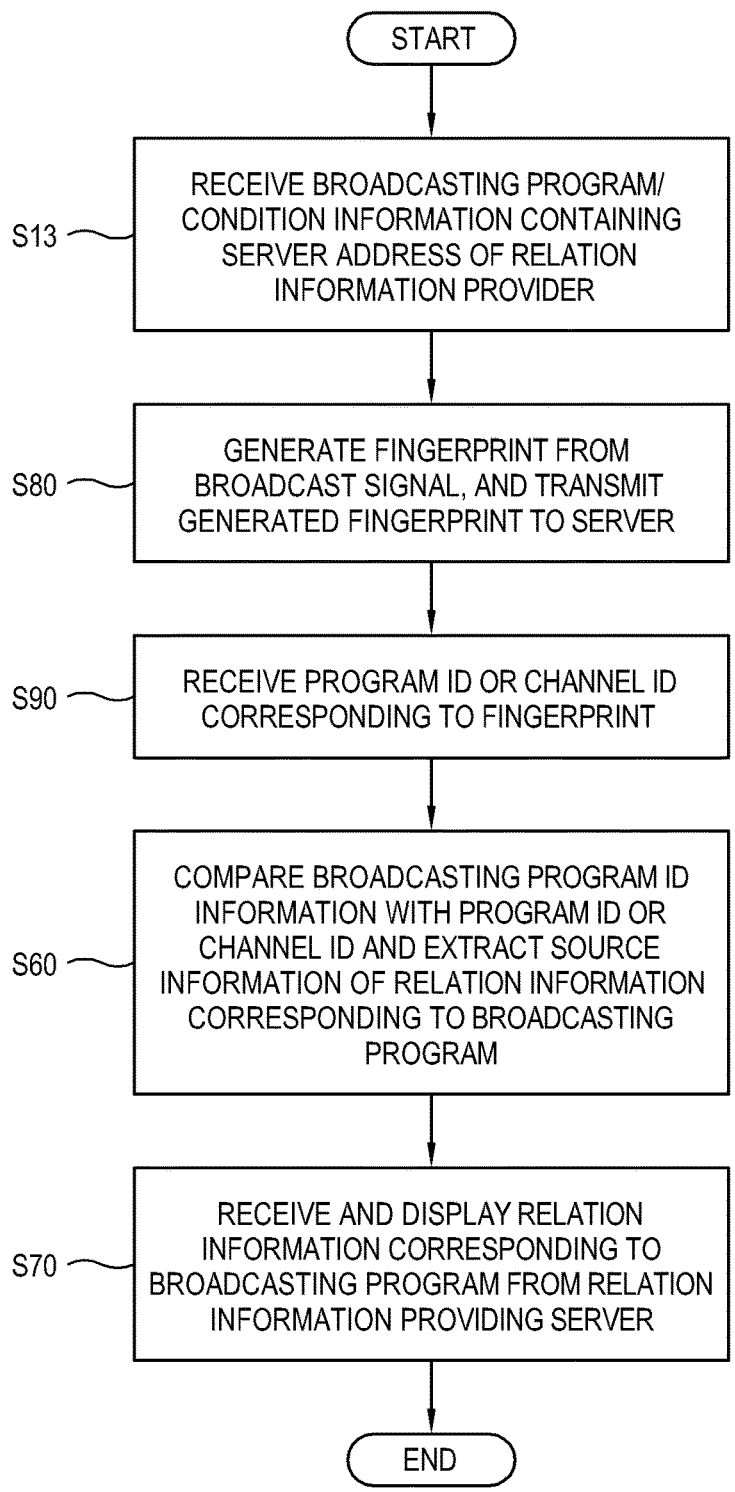
FIG. 8 is a control flowchart for explaining a method of providing relation information by the broadcast signal receiver of FIG. 7.

FIG. 8 is a control flowchart for explaining a method of providing relation information by the broadcast signal receiver of FIG. 7.

As shown in FIG. 8, at operation S13, the controller 60 receives the broadcast signal and the condition information containing the server address of the relation information providing server 200 and the broadcasting program identification information.

At operation S80, the controller 60 generates a fingerprint of a broadcasting program being currently displayed, and transmits the generated fingerprint to the server 400 that previously receives the broadcast signal containing the broadcasting program and stores the fingerprint corresponding to the broadcast signal.

Then, at operation S90, the broadcast signal receiver 100 receives the program ID or channel ID corresponding to the transmitted fingerprint from the server 400.

Then, at operation S60, as shown in FIG. 6, the controller 60 compares the program ID or the channel ID with the broadcasting program identification information contained in the condition information, and extracts the source information of the relation information corresponding to the broadcasting program being currently received and displayed.

At operation S70, the controller 60 receives the relation information corresponding to the extracted broadcasting program from the relation information providing server 200 and displays the relation information on the display unit 30.

According to an exemplary embodiment, the broadcast signal receiver 100 may acquire the broadcast signal identification information, such as the program ID or the channel ID, from the condition information providing server 300. In this case, the condition information providing server 300 may further include a fingerprint generator that previously receives the broadcast signal and generate the fingerprint. That is, a single server may provide both the condition information and the broadcast signal identification information.

Figure 9:
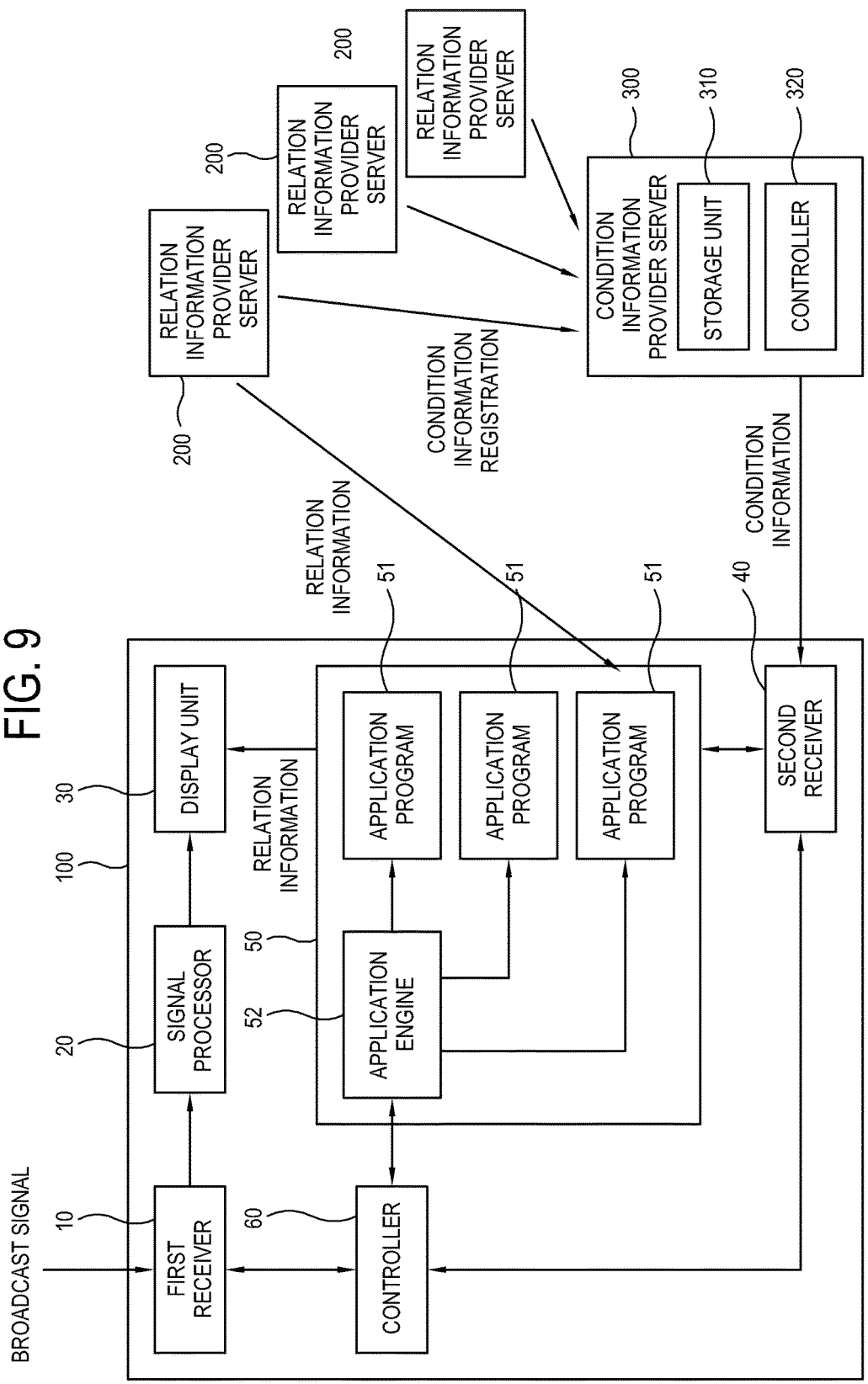
FIG. 9 is a control block diagram showing a system including a broadcast signal receiver according to an exemplary embodiment.

FIG. 9 is a control block diagram showing a system including a broadcast signal receiver according to an exemplary embodiment.

As shown in FIG. 9, the relation information provider 50 in this exemplary embodiment includes a plurality of application programs 51. The application engine 52 controls one of the plurality of application programs 51 to receive and provide the relation information. If the broadcast signal receiver 100 includes the plurality of application programs 51, the condition information received in the broadcast signal receiver 100 may include an application ID for selecting one of at least two application programs. As above, if the broadcast signal receiver 100 includes one application program, the application ID may be set up by a default or may not be set up. However, if there is a plurality of application programs, the broadcast signal receiver 100 selects which application program to be used for providing the relation information, and the application engine 52 controls the application program 51 selected in accordance with the application ID to provide the relation information. In other words, the application engine 52 informs the application program 51, selected in accordance with the application ID, of the server address of the relation information providing server 200.

Figure 10:
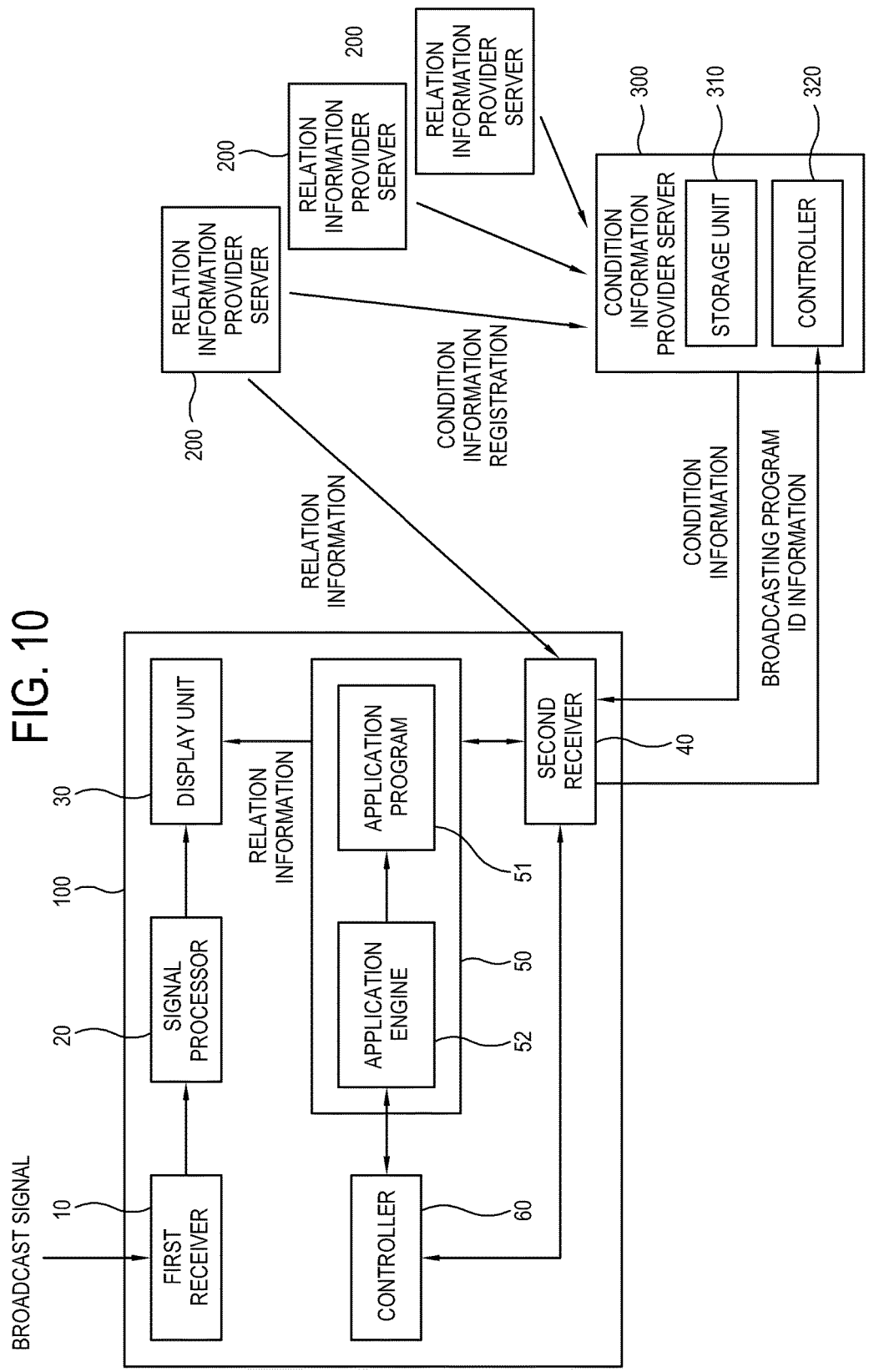
FIG. 10 is a control block diagram showing a system including a broadcast signal receiver according to an exemplary embodiment.

FIG. 10 is a control block diagram showing a system including a broadcast signal receiver according to an exemplary embodiment.

As shown in FIG. 10, the controller 60 sends the condition information providing server 300 the broadcasting program identification information corresponding to the broadcasting program being currently received. That is, the broadcast signal receiver 100 in this exemplary embodiment sends the condition information providing server 300 the broadcasting program identification information, such as the program or channel ID currently received for acquiring the condition information, and thus receives the condition information corresponding to the broadcasting program identification information from the condition information providing server 300.

As described above, the relation information providing server 200 registers the condition information to the condition information providing server 300. Such condition information contains a variety of information about which broadcasting program to provide the relation information. If receiving the broadcasting program identification information from the broadcast signal receiver 100, the condition information providing server 300 selects only the condition information matching with the broadcasting program identification information and provides the selected condition information to the broadcast signal receiver 100. In this case, the condition information may contain the application ID for selecting the application program and the source information of the relation information providing server 200 except the broadcasting program identification information such as the broadcasting station ID and the program ID.

The broadcast signal receiver 100 receiving the condition information receives the relation information from the relation information providing server 200 and displays the relation information on the display unit 30 as described above.

The controller 60 may extract the program or channel ID from the broadcast signal as shown in FIG. 5, and acquire the program or channel ID through the fingerprint and the server 400 storing the fingerprint.

Figure 11:
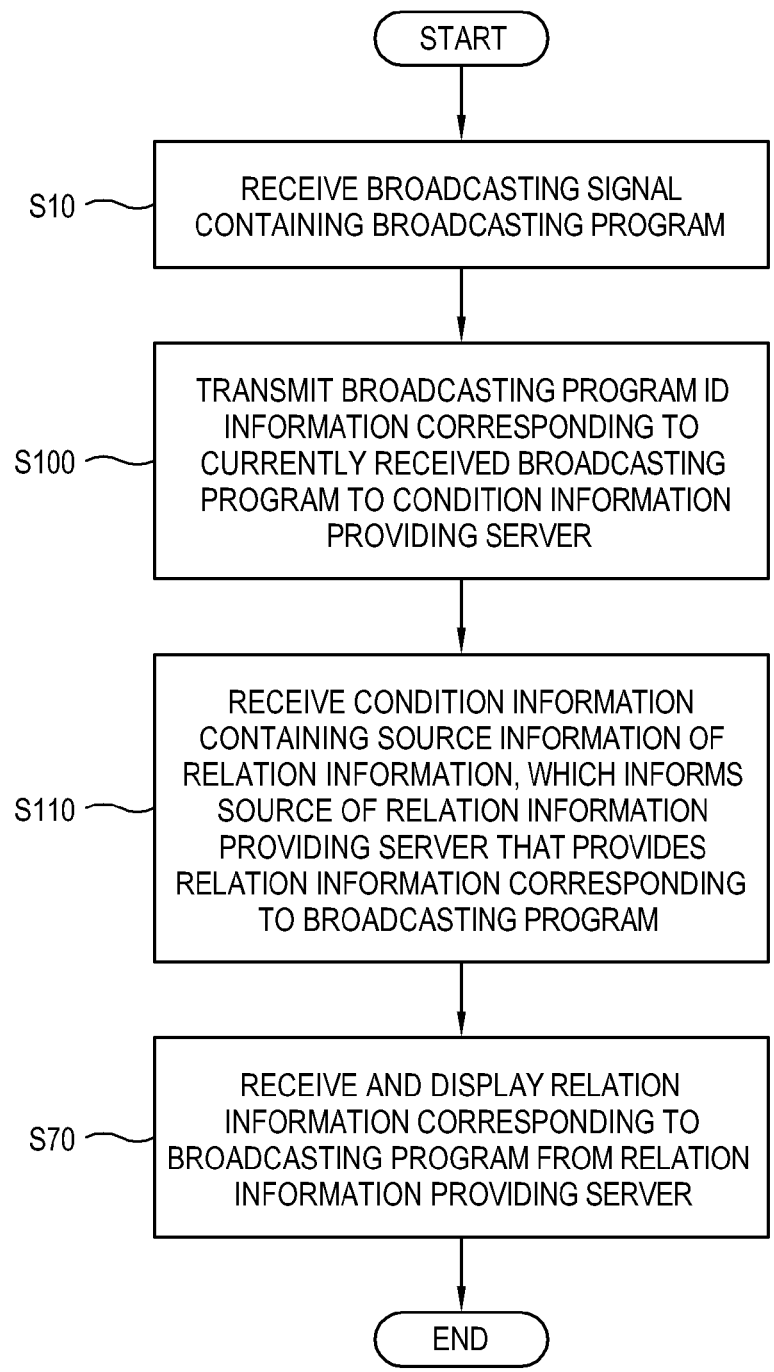
FIG. 11 is a control flowchart for explaining a method of providing relation information by the broadcast signal receiver of FIG. 10.

FIG. 11 is a control flowchart for explaining a method of providing relation information by the broadcast signal receiver of FIG. 10.

Referring to FIG. 11, the method of providing the relation information in the broadcast signal receiver is as follows.

First, at operation S10, a broadcast signal containing a broadcasting program is received.

At operation S100, the broadcasting program identification information corresponding to the broadcasting program being currently received is transmitted to the condition information providing server 300. The controller 60 may extract the program or channel ID from the broadcast signal, or may acquire the program or channel ID through the server 400.

At operation S110, the controller 60 receives the condition information containing the source information of the relation information, which informs a source of the relation information providing server 200 supplying the relation information matching with the broadcasting program, from the condition information providing server 300.

At operation S70, the controller 60 controls the second receiver 40 and the relation information provider 50 to receive the relation information through the source information of the relation information, and the relation information provider 50 processes the received relation information to be displayed on the display unit 30.

The exemplary embodiments illustrated in the FIGS. may be embodied by an apparatus that includes a bus coupled to every unit of the apparatus, at least one processor (e.g., central processing unit, microprocessor, etc.) that is connected to the bus for controlling the operations of the apparatus to implement the above-described functions and executing commands, and a memory connected to the bus to store the commands, received messages, and generated messages.

As will also be understood by the skilled artisan, the exemplary embodiments may be implemented by any combination of software and/or hardware components, such as a Field Programmable Gate Array (FPGA) or Application Specific Integrated Circuit (ASIC), which performs certain tasks. A unit or module may advantageously be configured to reside on the addressable storage medium and configured to execute on one or more processors or microprocessors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or modules or further separated into additional components and units or modules.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An image signal receiver comprising:
a signal receiver configured to receive a signal comprising image content;
an image signal processor configured to process the received image content to display an image;
a communicator configured to communicate with servers; and
a processor configured to:
extract an identification information from the signal received from the signal receiver;
transmit the identification information to a first server;
in response to the transmitting the identification information to the first server, control reception, from the first server through the communicator, of first information comprising a condition for providing a supplemental content corresponding to the image content and second information comprising an address on a second server;
determine that the condition described in the first information is satisfied based on the signal received from the signal receiver;
control access to the second server based on the address comprised in the second information;
control reception of the supplemental content from the second server, and
control display of the image content and the supplemental content based on the determination.

2. The image signal receiver according to the claim 1, wherein the image content comprises a broadcast program contained in a broadcast signal.

3. The image signal receiver according to the claim 1, wherein the controller is configured to display the received image content over the displayed image.

4. The image signal receiver according to the claim 1, wherein the first information comprises a broadcast identification information of at least one of a broadcast program and a broadcast channel, and
if the broadcast identification information corresponds to the image being displayed, the controller is configured to determine that the condition is satisfied.

5. The image signal receiver according to the claim 4, wherein the controller is further configured to transmit information of the displayed image to a third server, receive identification information of the displayed image from the third server, and compare the received identification information of the displayed image and the broadcast identification information comprised in the first information.

6. The image signal receiver according to the claim 1, wherein the controller is further configured to receive from the first server third information on an application program corresponding to the image content and display the received image content by executing the application program.

7. The image signal receiver according to the claim 1, wherein the controller is configured to periodically receive the first information from the first server.

8. The image signal receiver according to the claim 2, wherein the controller is configured to receive the first information from the first server in response to a broadcast channel of the broadcast signal changing.

9. A method of controlling an image signal receiver, the method comprising:
receiving a signal comprising image content;
processing the received image content to display an image;
extracting an identification information from the signal;
transmitting the identification information to a first server;
in response to the transmitting the identification information to the first server, receiving from the first server, of first information comprising a condition for providing a supplemental content corresponding to the image content and second information comprising an address on a second server;
determining that the condition described in the first information is satisfied based on the signal;
accessing the second server based on the address comprised in the second information;
receiving the supplemental content from the second server; and
displaying the image content and the supplemental content based on the determination.

10. The method according to the claim 9, wherein the image content comprises a broadcast program contained in a broadcast signal.

11. The method according to the claim 9, wherein the displaying comprises displaying the received image content over the displayed image.

12. The method according to the claim 9, wherein the first information comprises a broadcast identification information of at least one of a broadcast program and a broadcast channel, and
the determining comprises determining that the condition is satisfied if the broadcast identification information corresponds to the image being displayed.

13. The method according to the claim 12, wherein the determining comprises:
transmitting information of the displayed image to a third server;
receiving identification information of the displayed image from the third server, and
comparing the received identification information of the displayed image and the broadcast identification information comprised in the first information.

14. The method according to the claim 9, further comprising receiving from the first server third information on an application program corresponding to the image content,
wherein the displaying comprises displaying the received image content by executing the application program.

15. The method according to the claim 9, wherein the receiving comprises periodically receiving the first information from the first server.

16. The method according to the claim 10, wherein the receiving comprises receiving the first information from the first server in response to a broadcast channel of the broadcast signal changing.

17. A non-transitory computer-readable medium storing at least one computer program executable by an image signal receiver to perform operations, the operations comprising:
receiving a signal comprising image content;

processing the received image content to display an image;

extracting identification information from the signal;

transmitting the identification information to a first server;

in response to the transmitting the identification information to the first server, receiving from the first server, of first information comprising a condition for providing a supplemental content corresponding to the image content and second information comprising an address on a second server;

determining that the condition described in the first information is satisfied based on the signal;

accessing the second server based on the address comprised in the second information;

receiving the supplemental content from the second server; and displaying the image content and the supplemental content based on the determination.

18. The image signal receiver according to the claim 1, wherein the identification information comprising a fingerprint extracted from the signal received from the signal receiver.

19. The method according to the claim 9, wherein the identification information comprising a fingerprint extracted from the signal received from the signal receiver.

* * * * *